Patented Nov. 18, 1924.

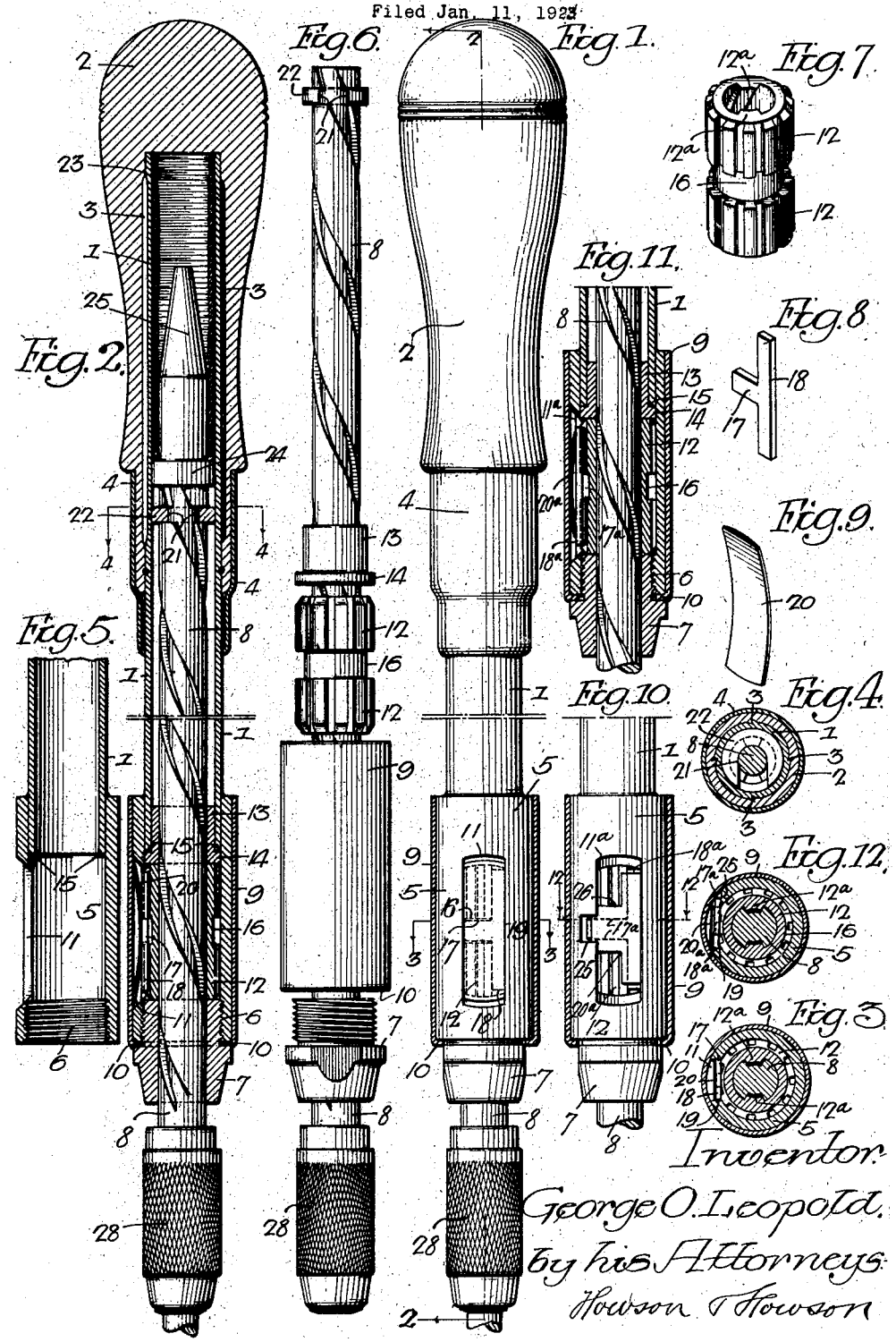

1,516,443

UNITED STATES PATENT OFFICE.

GEORGE O. LEOPOLD, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

PUSH SCREW DRIVER.

Application filed January 11, 1923. Serial No. 612,126.

*To all whom it may concern:*

Be it known that I, GEORGE O. LEOPOLD, a citizen of the United States, residing in Philadelphia, Pennsylvania, have invented certain Improvements in Push Screw Drivers, of which the following is a specification.

One object of my invention is to construct a push screw driver that can be turned in one direction only to drive a screw.

A further object of the invention is to construct the screw driver so that the entire mechanism can be removed from the body and the handle without disturbing the body or the handle.

In the accompanying drawings:

Fig. 1 is a side view of my improved push screw driver with the shell in section to illustrate the pawl and ratchet;

Fig. 2 is a longitudinal sectional view on the line 2—2, Fig. 1;

Fig. 3 is a transverse sectional view on the line 3—3, Fig. 1;

Fig. 4 is a transverse sectional view on the line 4—4, Fig. 2;

Fig. 5 is a detached sectional view of the casing and part of the body;

Fig. 6 is a view showing the spindle and its point withdrawn from the body;

Fig. 7 is a detached perspective view of the ratchet nut;

Fig. 8 is a perspective view of the pawl;

Fig. 9 is a perspective view of the pawl spring; and

Figs. 10, 11 and 12 are views of modifications of the invention.

Referring to the drawings, 1 is the tubular body of the screw driver. 2 is a handle driven onto the body and prevented from turning thereon by longitudinal ribs 3. On the end of the handle is a ferrule 4. Permanently secured to the body 1 is a casing 5 having an internal screw thread 6 at its lower end to receive a threaded sleeve 7, which is mounted loosely on a spirally cut spindle 8. A shell 9 encloses the casing 5 and has an inturned flange 10, which is confined between the sleeve 7 and the casing, as shown in Fig. 2. The casing 5 has a slot 11 in one side, in which a pawl is located.

12 designates a nut having two spiral ribs 12ª extending into the spiral grooves of the spindle 8. The nut is confined between a flanged collar 13 in the body 1 and the sleeve 7. A flange 14 of the collar rests against a shoulder 15 formed by the end of the body portion, as shown in Fig. 2.

When the parts are assembled, as in Figs. 1 and 2, the nut 12 is opposite the slot 11 in the casing 5. The nut has an annular groove 16, in which rests a tongue 17 of the pawl 18, which is so porportioned that it will be confined between one tooth of the nut and the wall 19 of the slot 11 in the casing 5 to hold the nut from turning when the handle is pushed to drive a screw into place. As the tongue 17 is located in the groove, it holds the pawl in proper position in respect to the teeth of the nut. A spring 20, shaped as shown in Fig. 9, rests in the slot 11 of the casing between the shell 9 and the pawl, yieldingly holding the pawl in engagement with the teeth of the nut. The spring yields when the handle is returned.

In the inner end of the spindle 8 is an annular groove 21 in which is a split ring 22. The ring is of the same diameter as the inner diameter of the tubular body 1 and is free to slide and to turn therein. The ring 22 prevents the withdrawal of the spindle as it comes in contact with the collar 13. When the sleeve 7 is detached from the casing 5, then the spindle, nut, sleeve and collar can be removed from the tubular body and casing.

In order to return the body to its normal position after a screw is driven, a coiled spring 23 is provided. This spring is located in the body 1, as shown in Fig. 2, between the handle and a flange 24 of a wooden plug 25. This plug rests against the end of the spindle 8. On the outer end of the spindle 8 is secured a chuck 28 of any suitable construction to receive a screw driver bit.

Figs. 10, 11 and 12 illustrate modifications of the arrangement of the pawl and its spring. The casing 5 is notched at 25. The tongue 17ª of the pawl 18ª extends into this notch as well as into the annular groove in the nut. The spring 20ª has a tongue 26, which is located in a slot 11ª of the casing and a projection of the tongue of the spring extends into the notch 25 above the tongue of the pawl. By this means, the pawl and spring are held in proper relation to the teeth of the nut.

This screw driver is a special tool for use in driving screws, the nut being held as the screw is driven. The nut is free to turn when the body portion is returned to its normal position by the coiled spring.

I claim:

1. The combination of a push screw driver, of a type having a spirally grooved spindle and a nut on the spindle, of a slotted casing; a nut having ratchet teeth thereon and also having an annular groove; and a pawl bearing upon the wall of the slot in the casing and arranged to engage the teeth of the nut, said pawl having a tongue extending into the groove of the nut.

2. The combination of a push screw driver, of a type having a spirally grooved spindle and a nut on the spindle, of a slotted casing; a nut having an annular groove therein and having two sets of ratchet teeth, one on each side of the groove; a pawl extending over both sets of teeth and resting against a wall of the slot in the casing, said pawl having a tongue projecting from one side and located in the groove of the nut; a spring located in the slot of the casing; and a shell enclosing the parts.

GEORGE O. LEOPOLD.